US011317321B1

(12) United States Patent
Paczkowski et al.

(10) Patent No.: US 11,317,321 B1
(45) Date of Patent: Apr. 26, 2022

(54) METHODS FOR DELIVERING NETWORK SLICES TO A USER

(71) Applicant: T-MOBILE INNOVATIONS LLC, Overland Park, KS (US)

(72) Inventors: Lyle W. Paczkowski, Mission Hills, KS (US); William M. Parsel, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 17/081,828

(22) Filed: Oct. 27, 2020

(51) Int. Cl.
*H04W 28/06* (2009.01)
(52) U.S. Cl.
CPC .................. *H04W 28/06* (2013.01)
(58) Field of Classification Search
CPC ..... H04W 72/04; H04W 24/02; H04W 48/16; H04L 41/0806; H04L 41/5003; H04L 41/0893; H04L 41/5019
See application file for complete search history.

(56) References Cited

U.S. PATENT DOCUMENTS

| 11,039,502 | B1* | 6/2021 | Huang .................. H04W 80/10 |
| 2009/0157692 | A1 | 6/2009 | Reinhardt et al. |
| 2019/0268335 | A1* | 8/2019 | Targali .................. H04L 9/3236 |
| 2019/0327757 | A1* | 10/2019 | Oteri .................. H04L 5/0053 |
| 2019/0363843 | A1* | 11/2019 | Gordaychik .......... H04L 1/1854 |
| 2020/0068431 | A1* | 2/2020 | Han .................. H04W 76/18 |
| 2021/0089637 | A1* | 3/2021 | Cummins .............. G06F 21/32 |
| 2021/0126828 | A1* | 4/2021 | Vidyashankar ......... H04L 41/28 |
| 2021/0127343 | A1* | 4/2021 | Mladin .................. H04W 4/70 |
| 2021/0289351 | A1* | 9/2021 | Ferdi .................. H04W 12/75 |
| 2021/0289455 | A1* | 9/2021 | Sun .................. H04W 16/28 |

(Continued)

FOREIGN PATENT DOCUMENTS

| CN | 109951311 A | 6/2019 |
| CN | 110535679 A | 12/2019 |
| CN | 111586716 A | 8/2020 |

OTHER PUBLICATIONS

Foreign Communication From a Related Counterpart Application, Invitation to Pay Additional Fees, dated Dec. 14, 2021, International Application No. PCT/US2021/048706.

(Continued)

*Primary Examiner* — Syed Ali

(57) ABSTRACT

A method for delivering a network slice to a user is disclosed. The method includes receiving communication from a network slice artifact comprising a multi-segment filename that includes a first segment comprising instructions for executing the network slice artifact, and a second segment comprising an identity of a network slice instantiable by the network slice artifact The method also includes retrieving a set of executable instructions associated with the network slice from a data store of the network in response to receiving the communication from the network slice artifact, and communicating the set of executable instructions to the network slice artifact whereby the network slice artifact instantiates the network slice transforming the computer system into an endpoint node of the network slice. The method further includes completing the instantiation of the network slice in response to receiving the communication from the network slice artifact.

13 Claims, 8 Drawing Sheets

(56) References Cited

U.S. PATENT DOCUMENTS

2021/0336893 A1\* 10/2021 Li ........................... H04L 47/34
2021/0352481 A1\* 11/2021 Guo ..................... H04W 4/029

OTHER PUBLICATIONS

Foreign Communication From a Related Counterpart Application, International Search Report and Written Opinion , dated Feb. 4, 2022, International Application No. PCT/US2021/048706.

\* cited by examiner

METHODS FOR DELIVERING NETWORK SLICES TO A USER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network slices provide a dedicated communication network for use by a user, such as an enterprise, organization, or individual, where the dedicated communication network may be delivered as a virtual resource to the user. From the point of view of the user, the network slice may behave as if it were a separate network infrastructure, but the network slice may be delivered by virtualized computing resources provided by a common physical communication and computing infrastructure. Network slices of some networks, such as 5G networks, may have a lifecycle including multiple distinct phases, including preparation, instantiation, run-time, and decommissioning. At least some of the lifecycle phases of the network slice, including preparation, instantiation, and decommissioning, may be performed by a carrier or provider of the network.

SUMMARY

In an embodiment, a method for delivering a network slice to a user is disclosed. The method includes receiving by a network a communication from a network slice artifact executing on a computer system, the network slice artifact comprising a multi-segment filename that includes a first segment comprising instructions for executing the network slice artifact, and a second segment comprising an identity of a network slice instantiable by the network slice artifact, wherein the communication comprises the identity of the network slice. The method also includes retrieving a set of executable instructions associated with the network slice by a first network function of the network from a data store of the network in response to receiving by the network the communication from the network slice artifact, and communicating the set of executable instructions by the first network function to the network slice artifact whereby the network slice artifact instantiates the network slice transforming the computer system into an endpoint node of the network slice. The method further includes completing the instantiation of the network slice on the network by a second network function of the network in response to receiving by the network the communication from the network slice artifact, wherein the network slice comprises a first set of network functions upon instantiation.

In an additional embodiment, another method for delivering a network slice to a user is disclosed. The method includes receiving by a network a first communication from a first network slice artifact executing on a computer system, the first communication comprising an identity of the first network slice, and comparing by a first network function of the network the identity of the first network slice communicated from the first network slice artifact with a first set of executable instructions associated with the first network slice. The method also includes retrieving the first set of executable instructions by the first network function from a data store of the network in response to matching the identity of the network slice with the first set of executable instructions, and communicating the first set of executable instructions by the first network function to the first network slice artifact whereby the first network slice artifact instantiates the first network slice transforming the computer system into an endpoint node of the first network slice. A hash of a binary code associated with the first set of executable instructions is embedded in the first network slice artifact and wherein the first network slice artifact is configured to execute the first set of executable instructions in response to matching the embedded hash with a hash of a binary code calculated from the first set of executable instructions received from the first network function.

In a further embodiment, another method for delivering a network slice to a user is disclosed. The method includes receiving by a home network a communication from a network slice artifact executing on a computer system, the communication travelling through a tunnel established in a foreign network separate and distinct from the home network prior to reaching the home network, the network slice artifact comprising a multi-segment filename comprising a first segment comprising instructions for executing the network slice artifact, and a second segment comprising an identity of a network slice instantiable by the network slice artifact, and wherein the communication comprises the identity of the network slice and an identity of the home network. The method also includes retrieving the set of executable instructions by a first network function of the home network from a data store of the home network in response to receiving by the home network the communication from the network slice artifact, and communicating the set of executable instructions by the first network function through the foreign network to the network slice artifact whereby the network slice artifact instantiates the network slice transforming the computer system into an endpoint node of the network slice These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
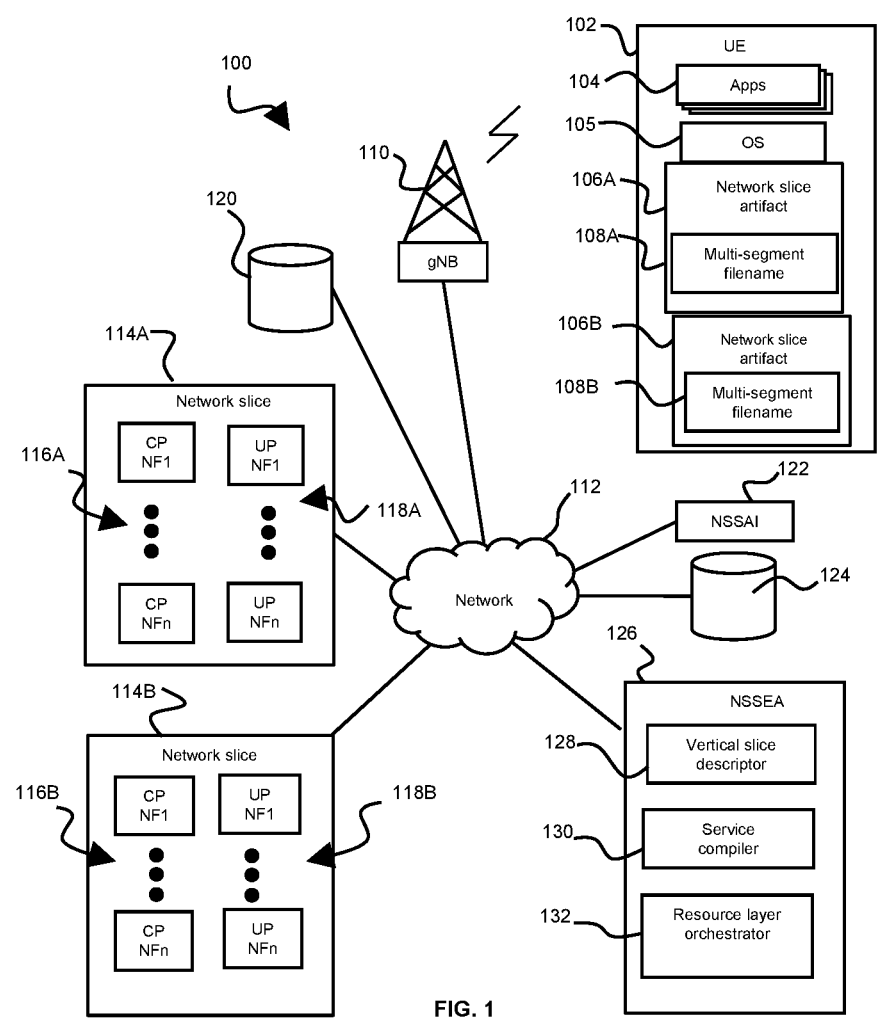
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A network slice may comprise a logical network providing specific network capabilities to one or more subscribers or users and may, upon instantiation, comprise a set of network functions and corresponding resources (e.g., computing, storage, and networking resources). As described above, a lifecycle of a network slice may comprise multiple distinct phases including preparation, instantiation, run-time, and decommissioning. In some conventional networks, the network provider may first perform the preparation, including designing and provisioning of the network environment, prior to the instantiation of the network slice. The preparation phase may involve the network provider preparing executable instructions (e.g., executable code). The executable instructions may be configured to provide a predefined set of network functions and network resources upon instantiation to ensure the network slice may meet a set of quality of service (QoS) parameters. In some instances, the set of QoS parameters may be codified in a service level agreement (SLA).

The instantiation phase may involve the network provider executing the instructions to thereby instantiate or activate the network slice, the instantiated network slice executing on network hardware (e.g., one or more servers of the network) and comprising a set of predefined network functions and associated resources (e.g., computing, storage, and networking resources) meeting the predefined QoS parameters.

Once the network slice has been prepared and instantiated by the network provider, a user may access and utilize at least some of the network functions provided by the network slice. For example, user equipment (UE) may provide an authorization request to the network via an access network that includes information regarding the slice/service type (SST). The registration request may also include authorization information, such as one or more authorization keys, indicating which network slices the user is authorized to access. One or more network functions serving the user (e.g., a device or piece of equipment of the user) may receive the registration request and may identify and retrieve the network slice instance corresponding to the authorization information provided in the authorization request. At a point in time following the activation of the network slice, the network provider may decommission or deactivate the network slice, thereby terminating access to the network slice and releasing the resources (e.g., networking resources) dedicated to the network slice. The decommissioning phase may terminate the lifecycle of the network slice.

As outlined above, typically the multiple phases making up the lifecycle of a network slice are controlled by the network provider or carrier. The network slice is created once at a first point in time by the network provider during the instantiation phase and terminated once at a second point in time, following the first point in time, by the network provider during the decommissioning phase, with the network slice being accessible to one or more users during the run-time phase extending between the instantiation and decommissioning phases. Once instantiated by the network provider, the resources allocated to the network slice may remain tied-up with the network slice irrespective of whether a user is currently utilizing the network slice. The resources allocated to the currently unused network slice may not be available to other network slices currently being accessed by other users, limiting the efficiency of the network in allocating resources between network slices. Additionally, typically network slices may not be re-instantiated following decommissioning and instead a new network slice must be prepared and then instantiated. Thus, network slices generally cannot be quickly and dynamically activated and deactivated in response to changing network service needs of users of the network. Instead, users may only utilize network slices of the network which have already been prepared and currently instantiated by the network provider, limiting the flexibility of the network in addressing the evolving needs of the user.

In an embodiment, systems and methods for flexibly delivering network slices to one or more users or subscribers of a network are provided. Particularly, a network slice artifact may be executed by a user to selectably instantiate one or more network slices at will. The user may possess a plurality of network slice artifacts providing a range of different capabilities from which the user may choose to instantiate based on the needs of the user at a particular time. Prior to executing the network slice artifacts, the user may also be able to define the network slice artifacts with reference to the QoS parameters and/or virtual network functions which comprise the network slices instantiable by the network slice artifacts. A provider or carrier of a network on which the network slices are instantiated may provision the network through one or more network elements or functions for the subsequent instantiation of the network slices following their definition by the user. Additionally, following the execution of one or more of the network slice artifacts by the user, one or more network functions or elements provided by the network carrier may complete the instantiation of the one or more network slices corresponding to the one or more executed network slice artifacts. Following completion of the instantiation of the one or more network slices, a user's equipment upon which the one or more network slice artifacts executes may be transformed into an endpoint node of the one or more instantiated network slices.

A network slice artifact or package may be delivered to user equipment (UE) of a user (e.g., an enterprise, organization, or individual) of the network. The network slice artifact may be delivered to the user physically in the form of a memory device (e.g., a USB drive, etc.) or electronically via e-mail or other means of communication. In some embodiments, the network slice artifact may be created by the network provider. However, in other embodiments, the network slice artifact may be created by a separate software developer that is independent of the network provider.

The network slice artifact may correspond to a network slice that has been prepared by a network provider or carrier such that the network environment has been provisioned for the future instantiation of the network slice. For example, prior to the delivery of the network slice artifact to the user, executable instructions (e.g., executable code, etc.) may be prepared by the network provider and saved in a data store of the network. In an embodiment, a network function, such as a Network Slice Assistance Information (NSSAI) function may perform the preparation and provisioning of the network slice. For example, the NSSAI function may create a block in a distributed leger that embodies the executable instructions for building the subject network slice and which contains authentication challenge keys usable to authenticate a user's UE attempting to trigger instantiation of the network slice. In some embodiments, the NSSAI may be a control plane (CP) function of the network.

In an embodiment, prior to preparation of the network slice by the network provider, the user may have the opportunity to define at least some of the parameters of the network slice. For example, the user may define at least some of the QoS parameters and at least some of the virtual network functions (VNFs) that compose the subject network slice. In an embodiment, the user may affect this definition through an application programming interface (API) extended by the network provider or by otherwise handing off the user provided definitions to the network provider. However, the network provider may place constraints (e.g., a maximum throughput constraint, a minimum packet loss constraint, etc.) on the parameters of the network slice to be prepared by the provider.

Although the network provider may prepare the network slice for future instantiation, the network provider may not instantiate the network slice. Instead, the user, rather than the network provider, may control the instantiation of the network slice following the preparation of the network slice by the network provider (e.g., via the NSSAI function). Particularly, once the network slice artifact has been delivered to a UE of the user, the user, at a time of the user's choosing, may instantiate the network slice by executing or invoking the network slice artifact on the UE. The network slice artifact may comprise all of the data and instructions used to authorize and build-out the network slice by the user.

Upon invoking of the network slice artifact on the UE, the network slice artifact may pull from the network all resources require to instantiate the network slice. For example, the network slice artifact may pull the executable instructions corresponding to the network slice that are stored on the network. Once the network slice artifact has received all required instructions from the network, the network slice artifact may instantiate the network slice whereby the network slice is accessible by the user through the UE on which the network slice artifact executes. In some embodiments, following instantiation, the UE upon which the network slice artifact is invoked may be transformed into an endpoint node of the network slice. Following instantiation of the network slice by the user, the UE may be transformed into a terminus or terminal server of the network slice that is behind a firewall of the user, providing a unique communication channel with the instantiated network slice.

In an embodiment, an intelligent network element or function, such as a network slice subnet element administrator (NSSEA) may interact with the invoked network slice artifact to complete the instantiation of the subject network slice. Particularly, the NSSEA may comprise a plurality of separate and distinct elements configured to complete instantiation of the subject network slice. The elements of the NSSEA may include a vertical slice descriptor for determining the parameters of the network slice identified in a communication provided to the network from the network slice artifact upon being invoked. The NSSEA may additionally include a service compiler for generating the functionality or services provided by the network slice identified in the communication provided to the network from the network slice artifact. The NSSEA may further include a resource layer orchestrator for provisioning a resource or hardware layer of the network with binary code necessary for the network to provide the parameters and functionality associated with the subject network slice.

Along with having the ability to selectably instantiate the network slice, the user, at a time of the user's choosing, may selectably deactivate the network slice thereby at least temporarily terminating the user's ability to access the network through the network slice. The user may deactivate the network slice by invoking the network slice artifact executing on the UE. In some embodiments, deactivating the network slice may release at least some of the resources allocated to the network slice such that the released resources may be utilized by other users of the network. For instance, the released resources may be reallocated to other currently instantiated network slices. In this manner, the user may choose to only initiate or activate the network slice when the user desires to access the network slice. By deactiving the network slice when it is not being used, the amount of allocated resources going unused at a particular moment in time may be minimized, thereby increasing the efficiency in allocating resources between users of the network.

Additionally, following the deactivation of the network slice by the user, the user, at a time of the user's choosing, may reactivate the deactivated network slice to once again instantiate the network slice. In an embodiment, the network provider may not need to re-provision the network environment for the reactivation of the network slice. Instead, invoking the network slice artifact executing on the UE, the network slice artifact may pull from the network the previously prepared resources required to instantiate the network slice. For example, the network slice artifact may pull one or more of the executable instructions stored on the network prior to the first activation of the network slice.

In some instances, more than one network slice artifact may be delivered to the UE of the user. For example, a first network slice artifact configured to instantiate a first network slice having one or more first QoS parameters (e.g., key performance indicators (KPIs) such as minimum and maximum throughput, delay, packet loss, etc.) and VNFs may be stored on the UE and be selectably invokable by the user, and a second network slice artifact configured to instantiate a second network slice having one or more second QoS parameters and VNFs that differ from the first QoS parameters may also be stored on the UE and may be selectably invokable by the user. By having multiple network slice artifacts stored on the UE, the user may selectably instantiate the first network slice and/or the second network slice depending on the network service needs of the user at a given point in time. The user may selectively deactivate one or more of the network slices and selectively reactivate one or more of the network slices as the network service needs of the user change over time. It may be understood that in some instances a user may have more than two network slice artifacts configured to instantiate more than two separate and distinct network slices having a range of QoS parameters and VNFs.

In an embodiment, the UE may roam onto a foreign network while still receiving services supplied by the network slice established in a home network. For example, the UE may comprise a mobile device disposed in a location only having network connectivity with a foreign network. In such a scenario, the UE may tunnel through the foreign network to establish a channel of communication with the home network, where the UE may instantiate a network slice in the home network and/or access functions or services provided by one or more instantiated network slices of the home network.

In an embodiment, the network slice artifact may comprise a single file having a multi-segment filename. Particularly, the filename may have a plurality of distinct segments or fields each containing a different type of information. For example, a first field or segment of the filename may comprise executable instructions (e.g., executable code) for executing the network slice artifact; an identity of a network slice may be embedded in a second field or segment of the filename, the identity being associated with or comprising executable instructions that are also stored in the network that define the network slice to be instantiated by the network slice artifact; and a third field or segment of the filename may comprise a hash of a binary code corresponding to the executable instructions.

The network slice artifact may thus be invoked or executed through invoking or executing the first segment of the multi-segment filename. Once invoked, the network slice artifact may reach out to the network and pull the executable instructions stored on the network. In an embodiment, one or more functions or elements of the network (e.g., the NSSAI and NSSEA described above) may confirm the identity of the network slice to be instantiated using the second segment of the filename, and may hand-off the executable instructions to the network slice artifact following confirmation of this identity. Once having received the executable instructions from the network onto the UE upon which the network slice artifact executes, the network slice artifact may use the hash contained in the third segment of the filename to confirm that the executable instructions have not been altered following the saving of the instructions onto the network. In an embodiment, the hash of the binary of the executable instructions may be created prior to or at the same time the executable instructions are stored on the network. Thus, if the calculated hash matches the third segment of the filename the user may confirm that the executable instructions have not been altered prior to executing the instructions on the UE as part of the process of instantiating the network slice.

The embodiments described herein are a specific technical solution to a specific technical problem. The technical problem includes, for example, (1) a user of a network slice lacking control over the timing of the instantiation and deactivation of an instance of the network slice, (2) the user being limited to accessing only those network slices of a network that have already been prepared and instantiated by a provider of the network, and (3) allowing the user to securely initiate the instantiation of the network slice whereby a UE of the user is transformed into a node of the network. Embodiments disclosed herein address these challenges through a network slice artifact executing on a UE of a user, the network slice artifact being configured to, upon invocation by the user, interact with one or more functions and/or elements of a network to instantiate (or deactivate if desired) a network slice defined by the network slice artifact whereby the UE is transformed into a node of the network. Embodiments disclosed herein also address these challenges by providing the network slice artifact with a multi-segment filename configured to execute the network slice artifact upon invocation of the artifact by the user, identify the executable instructions stored in the network corresponding to the network slice defined by the network slice artifact, and confirm that the executable instructions delivered to the network slice artifact from the network are in an unaltered condition.

Turning to FIG. 1, a communication system 100 is described. In an embodiment, the communication system 100 generally includes an electronic device (user equipment—UE) 102, an access node 110, a network 112, a plurality of network slices 114A, 114B, a first data store 120, a NSSAI 122, a second data store 124, and a NSSEA 126. The UE 102 may comprise, for example, a desktop computer, a workstation, a laptop computer, a tablet computer, a smartphone, a wearable computer, an internet of things (IoT) device, and/or a notebook computer. UE 102 may be operated by a user or customer of the network 112 such as an enterprise, organization, or individual.

The access node 110 of communication system 100 may provide communication coupling the UE 102 to the network 112 according to a 5G protocol, for example 5G, 5G New Radio, or 5G LTE radio communication protocols. The access node 110 may provide communication coupling the UE 102 to the network 112 according to a long-term evolution (LTE), a code division multiple access (CDMA), and/or a global system for mobile communication (GSM) radio communication protocol. The access node 110 may be referred to for some contexts as a gigabit Node B (gNB), an enhanced Node B (eNB), a cell site, or a cell tower. Additionally, while not shown, UE 102 may be communicatively coupled to the network 112 via a WiFi access point or another non-cellular radio device. Further, while a single access node 110 is illustrated in FIG. 1, it is understood that communication system 100 may comprise any number of access nodes 110.

The network 112 of communication system 100 may comprise one or more public networks, one or more private networks, or a combination thereof. For example, network 112 may comprise a 5G core network. Further details of 5G networks are discussed below with reference to FIGS. 6A, 6B. While shown as communicatively coupled to the network 112, network slices 114A, 114B, data stores 120, 124, NSSAI 122, and NSSEA 126 may be considered part of network 112 and are illustrated as separate from network 112 in FIG. 1 to promote discussing their roles with respect to UE 102, as will be discussed further herein. Additionally, although in FIG. 1 network 112 is shown as including only two network slices 114A, 114B, it may be understood that network 112 may include varying numbers of network slices.

Upon instantiation (as described further herein), first network slice 114A of network 112 may comprise a first set of QoS parameters (e.g., KPIs such as minimum and maximum throughput, delay, jitter, packet loss, etc.) while second network slice 114B, upon instantiation, may comprise a second set of QoS parameters which differ from the first set of QoS parameters. Additionally, upon instantiation, each network slice 114A, 114B may comprise one or more network functions, including VNFs. For example, upon instantiation first network slice 114A may comprise a first plurality of CP network functions 116A and a first plurality of UP network functions 118A configured to provide a first functionality to the user. Additionally, upon instantiation second network slice 114B may comprise a second plurality of CP network functions 1166 and a second plurality of UP network functions 118B configured to provide a second functionality to the user. The network functions (including network functions 116A, 118A) of first network slice 114A may differ from the network functions (including network functions 116B, 118B) of second network slice 114B, and thus the first functionality provided by the first network slice 114A to the user upon instantiation may differ from the second functionality provided by the second network slice 114B upon instantiation. In an embodiment, network slices 114A, 114B may be private and may specific to a particular user (e.g., the user of UE 102), such as a particular enterprise customer.

The UE 102 may include one or more applications 104 executable on an operating system (OS) 105 of the UE 102. The UE 102 may also include a plurality of network slice artifacts 106A, 106B each including a multi-segment filename 108A, 108B, respectively, and each network slice artifact 106A, 106B being executable on the OS 105 of UE 102. Although in FIG. 1 only two network slice artifacts 106A, 106B are shown, it may be understood that UE 102 may include varying numbers of network slice artifacts, including a single network slice artifact or more than two network slice artifacts.

Each network slice artifact 106A, 106B may be generally configured to instantiate a network slice, such as one of the network slices 114A, 114B, in response to being invoked by the user of UE 102. For example, first network slice artifact 106A may be configured to instantiate first network slice 114A while second network slice artifact 106B may be configured to instantiate second network slice 106B. Upon instantiation, UE 102 may access network 112 via the instantiated network slice 114A, 114B and may utilize one or more VNFs composing the particular instantiated network slice 114A, 114B. If desired, the user may instantiate both network slices 114A, 114B concurrently through invoking each of the network slice artifacts 106A, 106B. As will be described further herein, network 112 may first be prepared or provisioned for the future instantiation of network slices 114A, 114B by a carrier or provider of network 112 prior to the instantiation of the network slices 114A, 114B by the invoking of network slice artifacts 106A, 106B.

UE 102 may access various resources of network 112 through the particular instantiated network slice 114A, 114B. For example, a user of UE 102 may transmit information from UE 102 to the network slice artifact 106 through the instantiated network slice 114A, 114B and save the transmitted information on the network 112, such as on first data store 120. In an embodiment, portions of the data store 120 may comprise a hyperledger or blockchain that allows the user to securely store information on the network 112 through the communication provided between UE 102 and network 112 via the instantiated network slice 114. As an example, the user may comprise an enterprise customer and the UE 102 may comprise an IoT device giving off data from one or more sensors thereof, the data being securely capturable in the first data store 120 of network 112 via the communicative connection provided between UE 102 and network 112 by the instantiated network slice 114A, 114B. The data may, for example, be capturable in one or more blocks of a blockchain of the first data store whereby the captured data may be stored immutably once added to the first data store 120.

Following instantiation of one of the network slices 114A, 114B, the network slice artifact 106A, 106B corresponding to the instantiated network slice 114A, 114B may be configured to deactivate or decommission the instantiated network slice 114A, 114B in response to the user invoking the network slice artifact 106A, 106B executing on UE 102. Following deactivation of the network slice instance 114A, 114B, UE 102 may no longer have access to network 112 through the deactivated network slice 114A, 114B. Additionally, UE 102 may no longer have access to resources of the network 112, such as VNFs and/or data storage (e.g., via first data store 120) provided through the deactivated network slice 114A, 114B.

Additionally, the network slice artifact 106A, 106B, may be invoked by the user to re-instantiate the corresponding network slice 114A, 114B, respectively, following the deactivation of the network slice 114A, 114B. In an embodiment, the network 112 need not be re-provisioned by the network provider prior to re-instantiating the network slices 114A, 114B.

As an example, based on given networking service needs of the user at a given point in time, the user may invoke both the first network slice artifact 106A and the network slice artifact 106B to thereby instantiate both the first network slice 114A and second network slice 114B. Following instantiation, the user may access network 112 from UE 102 through both network slices 114A, 114B and may avail itself of the resources provided by both network slices 114A, 114B. However, in response to a change to the networking service needs of the user, the user may invoke, for example, the first network slice artifact 106A to thereby deactivate the first network slice 114A. Following deactivation of the first network slice 114A, the user may only access the network 112 from UE 102 through the still instantiated second network slice 114B. In response to a further change in the network service needs of the user, the user may invoke, for example, the first network slice artifact 106A to re-instantiate the first network slice 114A and invoke the second network slice artifact 106B to deactivate the second network slice 114B, leaving the user with access to the network 112 from UE 102 via only the first network slice 114A. In this manner, the user may tailor the access provided to network 112 via network slices 114A, 114B.

As mentioned above, network 112 may be prepared for the future instantiation of network slices 114A, 114B prior to their instantiation by network slice artifacts 106A, 106B. In an embodiment, the network provider may prepare network 112 for the instantiation of network slices 114A, 114B through the NSSAI 122 of network 112. In an embodiment, NSSAI 122 may comprise a CP function of network 112. The provider of network 112 may develop executable instructions or code configured to build a network slice (e.g., one of network slices 114A, 114B) having predefined QoS parameters and functionality provided by one or more predefined VNFs.

In an embodiment, the user for which the network slice is intended to be utilized may have at least some control over the predefined QoS parameters and functionality providable by the executable instructions. For example, the user may provide one or more preferred QoS parameters and/or functions provided by preferred VNFs to the network provider through, for example, an API extended by the network provider to the user, or through other means (e.g., via e-mail, etc.). In an embodiment, the network provider may place constraints on the predefined QoS parameters and functionality of the network slice. For instance, the network provider may not allow the user to select a maximum throughput for the network slice that exceeds a maximum throughput limit set by the network provider, a minimum packet loss that is less than a minimum packet loss limit set by the provider, a minimum latency that is less than a minimum latency limit set by the provider, etc.

Once the provider of network 112 has completed developing the executable instructions for building the subject network slice, the provider of network 112 may create a network slice artifact (e.g., one of network slice artifacts 106A, 106B) corresponding to the network slice to be created for the user. In an embodiment, each network slice artifact 106A, 106B may comprise a ledger or blockchain stored in a memory of the UE 102. Executable instructions or code (e.g., microcontracts, etc.) may be stored in one or more blocks of the blockchains comprising network slice artifacts 106A, 106B and which may be configured to instantiate the network slices 114A, 114B, respectively, upon being invoked by the user.

In an embodiment, each network slice artifact 106A, 106B comprises a file including a multi-segment filename 108A, 108B, respectively, and thus in creating the network slice artifact the provider of network 112 may create a file including a multi-segment filename. As described further herein, each field or segment of the multi-segment filename 108A, 108B of each network slice artifact 106A, 106B may include a different type of information utilized in the instantiation of network slices 114A, 114B, respectively.

Figure 2A:
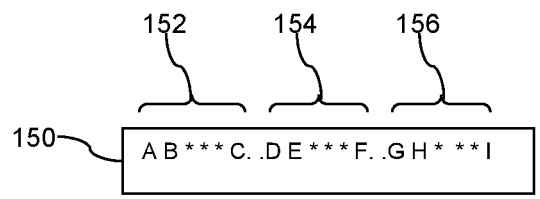
FIG. 2A is an illustration of a first multi-partition filename format according to an embodiment of the disclosure.
Figure 2B:
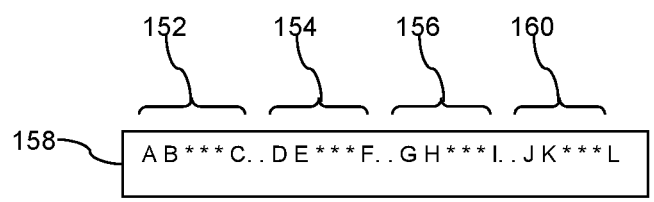
FIG. 2B is an illustration of a second multi-partition filename format according to an embodiment of the disclosure.
Figure 2C:
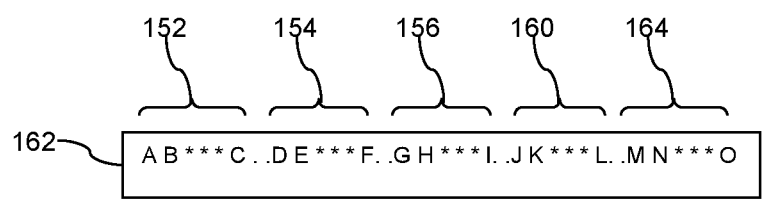
FIG. 2C is an illustration of a third multi-partition filename format according to an embodiment of the disclosure.

For example, turning now to FIG. 2A, a first multi-segment filename format 150 is described. The first multi-segment filename format 150 comprises a first field or segment 152, a second field or segment 154, and a third field or segment 156. In the first format 150, the first segment 152 is separated from the second segment 154 by two dots ('..'), and the second segment 154 is separated from the third segment 156 by two dots ('..'). Turning now to FIG. 2B, a second multi-segment filename format 158 is described. The second multi-segment filename format 158 comprises the first field or segment 152, the second field or segment 154, the third field or segment 156, and a fourth field or segment 160. In the second format 158, the first segment 152 is separated from the second segment 154 by two dots ('..'), the second segment 154 is separated from the third segment 156 by two dots ('..'), and the third segment 156 is separated from the fourth segment 160 by two dots ('..'). Turning now to FIG. 2C, a third multi-segment filename format 162 is described. The third multi-segment filename format 162 comprises the first field or segment 152, the second field or segment 154, the third field or segment 156, the fourth field or segment 160, and a fifth field or segment 164. In the third format 162, the first segment 152 is separated from the second segment 154 by two dots ('..'), the second segment 154 is separated from the third segment 156 by two dots ('..'), the third segment 156 is separated from the fourth segment 160 by two dots ('..'), and the fourth segment 160 is separated from the fifth segment 164 by two dots ('..'). It is understood that distinctive delimiters other than double dots ('..') may also be used in some embodiments to demark the separation of segments of the filename.

Each of the fields or segments 152, 154, 156, 160, 164 may comprise from one character up to a maximum number of characters. Different fields or segments 152, 154, 156, 160, 164 may be associated with a different maximum number of characters. For example, the first field or segment 152 may be associated with a maximum of 255 characters, and the second field or segment 154 may be associated with a maximum of 10,500 characters. Characters may be referred to as symbols in some context. Characters may be lowercase alphabetic characters, uppercase alphabetic characters, numerals, special characters such as exclamation mark (!), number sign (#), asterisk (*), or other special characters. Some characters may be deemed invalid in one or more of the fields or segments 152, 154, 156, 160, or 164. Characters may comprise American standard code for information interchange (ASII) characters. Characters may comprise extended binary coded decimal interchange code (EBCDIC) characters.

The multi-segment filenames 108A, 108B illustrated in FIG. 1 may be formatted in accordance with any of the multi-segment filename formats 150, 158, or 162. The multi-segment filenames 108A, 108B illustrated in FIG. 1 may not all be of the same multi-segment filename format 150, 158, or 162. For example, first multi-segment filename 108A may be formatted in accordance with the first multi-segment filename format 150, second multi-segment filename 108B may be formatted in accordance with the second multi-segment filename format 158. While multi-segment filename formats having three segments, four segments, and five segments have been illustrated, it is contemplated that the teachings of the present disclosure may advantageously be used in multi-segment filename formats comprising two segments and comprising six or more segments.

Returning to FIG. 1, in an embodiment, a first segment of each of the multi-segment filenames 108A, 108B may comprise executable instructions or code invokable by the user of UE 102 to thereby execute the corresponding network slice artifact 106A, 106B, respectively. Thus, the first segment of each of the multi-segment filenames 108A, 108B may comprise a triggering mechanism through which the user may, at a time of the user's choosing, execute the network slice artifacts 106A, 106B, respectively, to either instantiate or deactivate the corresponding network slices 114A, 114B.

In an embodiment, a second segment of each of the multi-segment filenames 108A, 108B may comprise information identifying the network slice (e.g., one of network slices 114A, 114B) associated with the particular multi-segment filename 108A, 108B. The identity of the network slice may be associated with or even comprise the executable instructions that are also stored on network 112 and which define the parameters of the network slice 114A, 114B corresponding to the network slice artifact 106A, 106B, respectively. The information contained in the second segment of each multi-segment filename 108A, 108B may thus comprise the biology or "DNA" of the subject network slice 114A, 114B, identifying who owns the subject network slice 114A, 114B, how the subject network slice 114A, 114B is configured, how the subject network slice 114A, 114B is intended to perform (e.g., according to the first and second set of QoS parameters and first and second functionalities described above), etc. The information contained in the second segment of each multi-segment filename 108A, 108B may include a SST which includes excepted behavior of the network slice 114A, 114B, respectively, to be initiated, and a slice differentiator (SD) including optional information that complements the SST to differentiate the network slice 114A, 114B from other network slices of the same SST.

In an embodiment, a third segment of each of the multi-segment filenames 108A, 108B may comprise information including a hash of a binary code associated with the executable instructions identified in the second segment of the multi-segment filename 108A, 108B. The third segment of the multi-segment filename 108A, 108B may be used to confirm that executable instructions received from network 112 and identified in the second segment of each multi-segment filename 108A, 108B has not been tampered with or otherwise corrupted. Additionally, in an embodiment, the third segment of each multi-segment filename 108A, 108B may include a copy of the binary code itself for running the instantiated network slice along with a hash of the binary code. Although the provider of network 112 is described above as creating the network slice artifacts 106A, 106B, it may be understood that actors other than the provider of network 112 may create and/or deliver the network slice artifact 106A, 106B to the user. For example, a separate software developer independent of the provider of network 112 may create the network slice artifact and sell or license the created network slice artifact to the user.

Prior to delivering the network slice artifacts 106A, 106B to UE 102, network 112 may be prepared for the future instantiation of network slices 114A, 114B by the user. Particularly, executable instructions may be stored on the network 112 which define the parameters and functionality of the network slice (e.g., one of network slices 114A, 114B) to be instantiated by the user. The executable instructions stored on the network 112 may be identified in the second segment of one of the multi-segment filenames 108A, 108B. For example, a first set of executable instructions may define the parameters of first network slice 114A and may be identified in the second segment of the first multi-segment filename 108A of first network slice artifact 106A while a second set of executable instructions may define the parameters (e.g., QoS parameters) and functionality of second network slice 114B and may be identified in the second segment of the second multi-segment filename 108B of second network slice artifact 106B.

The executable instructions, such as the first and second sets of executable instructions described above, may, in addition to defining the parameters of the network slice to which they are associated, include one or more authentication challenge keys. The authentication challenge keys may be used to authenticate a user's device (e.g., UE 102) attempting to trigger the instantiation of a network slice associated with the executable instructions.

In an embodiment, the NSSAI 122 of network 112 may be configured to store the executable instructions (e.g., executable instructions associated with one of network slice artifacts 106A, 106B) created by, for example, the provider of network 112 onto a location on the network 112. For example, NSSAI 122 may be configured to store the executable instructions in second data store 124, where second data store 124 may comprise a distributed ledger and NSSAI 122 may be configured to create a block in a blockchain of the distributed ledger whereby the executable instructions may be saved immutably such that the instructions may not be altered once they are saved in the ledger. By storing the executable instructions on the network 112 (e.g., using second data store 124), the NSSAI 122 may prepare the network 112 for the invocation of the network slice artifact 106A, 106B associated with the stored executable instructions.

Following the preparation of network 112 for the instantiation of network slices 114A, 114B, such as through the storing of the first and second sets of executable instructions on the network 112 described above, the user may invoke one of or both of the network slice artifacts 106A, 106B to thereby instantiate one of or both of the network slices 114A, 114B. Thus, following the preparation of network 112, the user may instantiate network slices 114A, 114B at a time of the user's choosing.

In an embodiment, the user may invoke, for example, the first network slice artifact 106A by invoking the first segment of first multi-segment filename 108A, causing instructions embedded in the first segment to execute on the OS 105 of UE 102. Upon being invoked, the first network slice artifact 106A may communicate the embedded identity of the first network slice 114A to the network 112, the identity of the first network slice 114A being associated with and/or identifying the executable instructions associated with slice 114A. NSSAI 122 of network 112 may interface with UE 102, and upon receiving the identity of the first network slice 114A from the first network slice artifact 106A executing on UE 102, may retrieve the executable instructions stored on the network 112 (e.g., in second data store 124) associated with first network slice 114A.

As NSSAI 122 retrieves the executable instructions, NSSAI 122 may confirm that the identity of the first network slice 114A provided by first network slice artifact 106A corresponds with one of the first set of executable instructions stored on the network, confirming that the contents of the second segment of first multi-segment filename 108A have not been compromised during or following the delivery of the first network slice artifact 106A to the user. Additionally, NSSAI 122 may, along with the identity of the first network slice 114A, receive one or more authentication challenge keys from the first network slice artifact 106A also embedded in the second segment of first multi-segment filename 108A. NSSAI 122 may use the authentication challenge keys provided by the network slice artifact 106A to confirm artifact 106A is authorized to instantiate first network slice 114A.

After confirming first network slice 106A has the required authorizations and having retrieved the first set of executable instructions, NSSAI 122 may communicate the first set of executable instructions to the first network slice 106A. Upon receiving the first set of executable instructions from NSSAI 122, may calculate a hash of the first set of executable instructions and compare the calculated hash with the hash embedded in the third segment of the first multi-segment filename 108A. In an embodiment, first network slice 106A may invoke a hash function executable by the OS 105 of UE 102 to calculate the hash of the first set of executable instructions. By comparing the calculated hash with the hash embedded in the first multi-segment filename 108A, the first network slice artifact 106A may confirm that the first set of executable instructions are in an original, unaltered state corresponding to the identity of the first network slice 114A embedded in the second segment of the first multi-segment filename 108A, the identity of the first network slice 114A being associated with the first set of executable instructions.

As described above, the first multi-segment filename 108A may provide for two-way authentication of the condition of the first set of executable instructions. First, the NSSAI 122 may utilize the identity of the first network slice 114A provided by the second segment of first multi-segment filename 108A to confirm the authenticity of the information provided by the first network slice artifact 106A by comparing and matching this information with the first set of executable instructions stored on the network 112. Second, first network slice artifact 106A may utilize the hash embedded in the third segment of the first multi-segment filename 108A to confirm the authenticity of the first set of executable instructions received from the NSSAI 122 of network 112.

After confirming the authenticity of the first set of executable instructions received from NSSAI 122, first network slice artifact 106A may execute the received first set of executable instructions to initiate the instantiation of first network slice 114A. In an embodiment, the first set of executable instructions may execute on the OS 105 of UE 102. As the first set of executable instructions execute on UE 102, the instructions may form a communicable channel between UE 102 and network 112 through the first network slice 114A. In doing so, UE 102 may be transformed into an endpoint node of the first network slice 114A that is below a firewall provided by UE 102 and/or a session border controller of network 112.

In addition to communicating the first set of executable instructions to the first network slice artifact 106A, NSSAI 122 may interface with NSSEA 126 of network 112 to complete the instantiation of first network slice 114A. NSSEA 126 may comprise a plurality of functions or elements configured to complete the instantiation of a network slice (e.g., first network slice 114A) above the firewall and within network 112. In an embodiment, NSSEA 126 may comprise a vertical slice descriptor 128, a service compiler 130, and a resource layer orchestrator 132.

The vertical slice descriptor 128 of NSSEA 126 may interface with the NSSAI 122 and may be configured to determine the parameters of the network slice (e.g., one of network slices 114A, 114B) based on the identity of the network slice provided to the NSSAI 122 from a network slice artifact (e.g., network slice artifacts 106A, 106B). For instance, in response to receiving by the network 112 an identity of first network slice 114A from the first network slice artifact 106A, the vertical slice descriptor 128 may interface with NSSAI 122 to determine the first set of QoS parameters with the first network slice 114A.

The service compiler 130 of NSSEA 126 may also interface with NSSAI 122 and may be configured to generate the functionality or services to be provided by a network slice (e.g., one of network slices 114A, 114B) based on the identity of the network slice provided to the NSSAI 122 from a network slice artifact (e.g., network slice artifacts 106A, 106B). For instance, in response to receiving by the network 112 an identity of first network slice 114A from the first network slice artifact 106A, the service compiler 130 may interface with NSSAI 122 to generate the first functionality associated with the first network slice 114A. The functionality or services provided by a particular network slice may be tailored to the specific needs of a given user, such as a particular enterprise customer. For example, the functionality of a particular network slice may comprise a payment transfer mechanism, a supply chain infrastructure, an inventory control mechanism, etc.

The resource layer orchestrator 132 of NSSEA 126 provisions a resource layer of the network 112 (e.g., hardware of the network 112) with binary code associated with the first set of executable instructions whereby the resource layer is equipped to provide the parameters (e.g., QoS parameters) and functionality associated with the network slice. To state in other words, resource layer orchestrator 132 may orchestrate the instantiation of the network slice from a resource or hardware level of network 112. In an embodiment, the vertical slice descriptor 128, service compiler 130, and resource layer orchestrator 132 of NSSEA 126 may each be associated with one or more segments of each multi-segment filename 108A, 108B.

The instantiation of the subject network slice (e.g., one of network slices 114A, 114B) may be completed following the execution of the vertical slice descriptor 128, service compiler 130, and resource layer orchestrator 132 of NSSEA 126. In an embodiment, the NSSEA 126 need no longer interface with either the NSSAI 122 or UE 102 (now comprising an endpoint node of one of or both of network slices 114A, 114B) following the completion of the instantiation of the subject network slice. Instead, the vertical slice descriptor 128, service compiler 130, and resource layer orchestrator 132 of NSSEA 126 may only be invoked in response to the invoking of one of the network slice artifacts 106A, 106B.

Following the completion of the instantiation of the subject network slice, applications 104 of UE 102 may interact with the instantiated network slice and thereby access functionalities or services provided by the subject network slice. For instance, upon first network slice 114A being instantiated through the invoking of first network slice artifact 106A and the execution of NSSEA 126, applications 104 executing on UE 102 may be operated to access the first functionality (e.g., a payment transfer mechanism, a supply chain infrastructure, an inventory control mechanism, etc.) provided by the first network slice 114A. Similarly, upon second network slice 114B being instantiated through the invoking of second network slice artifact 106B and the execution of NSSEA 126, applications 104 executing on UE 102 may be operated to access the second functionality (e.g., a payment transfer mechanism, a supply chain infrastructure, an inventory control mechanism, etc.) provided by the second network slice 1146.

Additionally, as described above, the user may selectably invoke network slice artifacts 106A, 106B to deactivate network slices 114A, 114B and re-instantiate network slices 114A, 114B as the network service needs of the user change over time. In an embodiment, network slices 114A, 114B may be re-instantiated through the invocation of network slices 106A, 106B, respectively, and the execution of NSSEA 126 without the need of re-provisioning the network 112 prior to the re-instantiation of network slices 114A, 114B. NSSEA 126 may be configured to assist with the deactivation and re-instantiation of network slices, such as network slices 114A, 114B. For example, NSSEA 126 may store a history (e.g., within second data store 124) of all instantiated network slices (e.g., network slices 114A, 114B). Using this stored history, NSSEA 126 may selectably assist with re-instantiation of any previously instantiated network slices, including network slices 114A, 114B.

In an embodiment, the user through UE 102 may roam onto a foreign network (separate and distinct form network 112) while still receiving the functionality or services provided by the instantiated network slices 114A, 114B existing within network 112 (the "home" network in this example). For example, the UE 102 may comprise a portable device disposed in a location where UE 102 only has access to the foreign network. However, the UE 102 may connect with the foreign network, tunnel through the foreign network, and reach network 112 via communication provided between the foreign network and network 112 whereby UE 102 may utilize the functionality or services provided by one or more network slices formed in network 112 and associated with UE 102. Particularly, UE 102 may first establish a tunnel into and through the foreign network. Once the foreign network has established a connection with network 112 (via the tunnel), UE 102 may interact with network 112 via one or more network slices. In an embodiment, UE 102, using network slice artifacts 106A, 106B may instantiate network slices 114A, 114B in network 112 by tunneling through the foreign network once the tunnel through the foreign network has been established.

In an embodiment, one of the fields of multi-segment filenames 108A, 108B of network slice artifacts 106A, 106B may include executable instructions or code instructing the UE 102 to tunnel through the foreign network (when UE 102 is disposed in a location where UE 102 only has access to the foreign network and thus does not have direct access to network 112) in order to reach network 112. For instance, the second segments of multi-segment filenames 108A, 108B may include, along with the identities of network slices 114A, 114B, respectively, an identity of a preferred or "home" network associated with the respective network slice 114A, 114B. The identity of the home network may comprise, for example, an internet protocol (IP) address associated with the home network. Additionally, the multi-segment filenames 108A, 108B may comprise instructions communicable to the foreign network to instruct the foreign network to interface with any network functions (e.g., NSSAI 122, NSSEA 126) of network 112 (the home network) necessary to instantiate network slices 114A, 114B.

Figure 3:
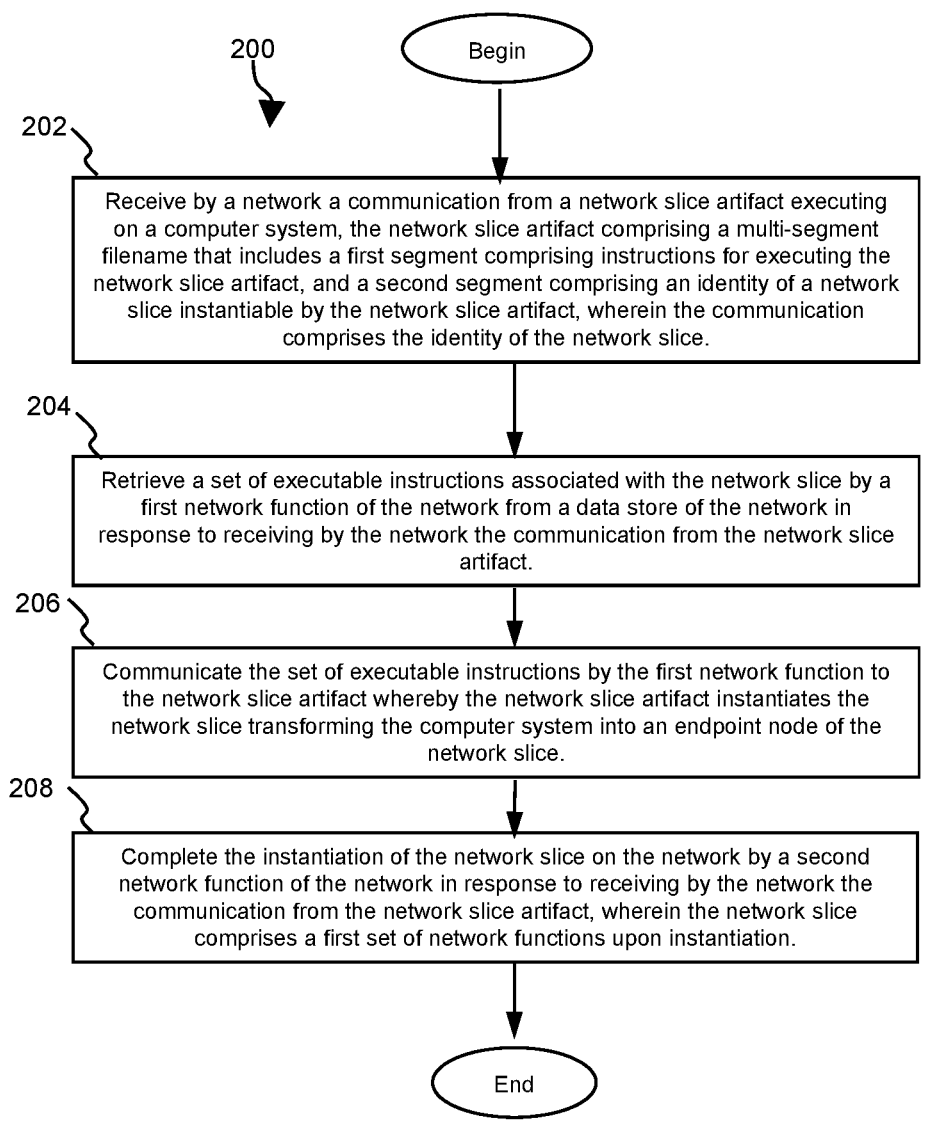
FIG. 3 is a flow chart of a method according to an embodiment of the disclosure.

Turning to FIG. 3, a method 200 is described. In an embodiment, the method 200 is a method for delivering a network slice to a user. At block 202, the method 200 comprises receiving by a network (e.g., network 112 illustrated in FIG. 1) a communication from a network slice artifact (e.g., one of network slice artifacts 106A, 106B illustrated in FIG. 1) executing on a computer system (e.g., UE 102 illustrated in FIG. 1), the network slice artifact comprising a multi-segment filename (e.g., one of multi-segment filenames 108A, 108B illustrated in FIG. 1) that includes a first segment comprising instructions for executing the network slice artifact, and a second segment comprising an identity of a network slice (e.g., one of network slices 114A, 114B illustrated in FIG. 1) instantiable by the network slice artifact, wherein the communication comprises the identity of the network slice. At block 204, the method 200 comprises retrieving a set of executable instructions associated with the network slice by a first network function (e.g., NSSAI 122 illustrated in FIG. 1) of the network from a data store (e.g., second data store 124 illustrated in FIG. 1) of the network in response to receiving by the network the communication from the network slice artifact.

At block 206, the method 200 comprises communicating the set of executable instructions by the first network function to the network slice artifact whereby the network slice artifact instantiates the network slice transforming the computer system into an endpoint node of the network slice. At block 208, the method 200 comprises completing the instantiation of the network slice on the network by a second network function (e.g., NSSEA 126 illustrated in FIG. 1) of the network in response to receiving by the network the communication from the network slice artifact, wherein the network slice comprises a first set of network functions (e.g., network functions 116A, 116B, 118A, and/or 118B illustrated in FIG. 1) upon instantiation.

Figure 4:
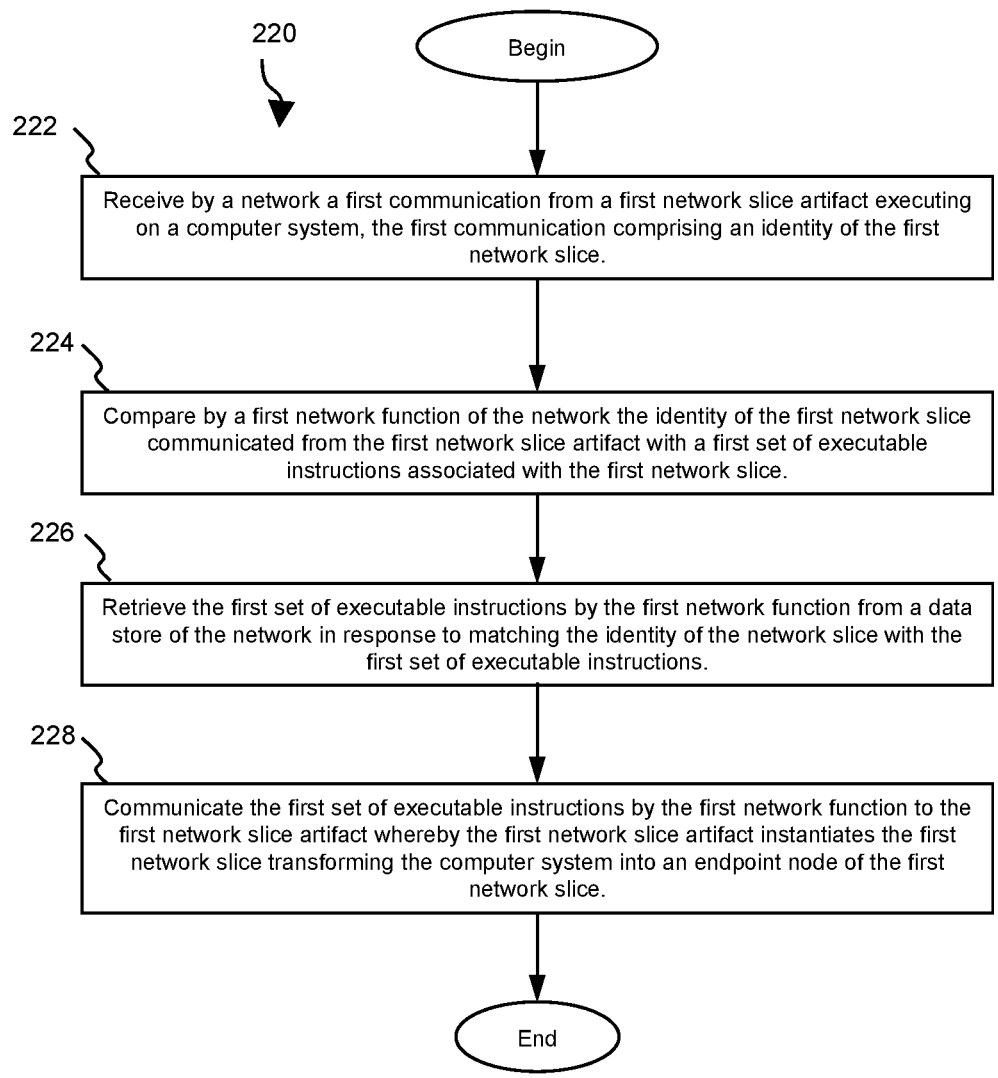
FIG. 4 is a flow chart of another method according to an embodiment of the disclosure.

Turning to FIG. 4, a method 220 is described. In an embodiment, the method 220 is another method for delivering a network slice to a user. At block 222, the method 220 comprises receiving by a network (e.g., network 112 illustrated in FIG. 1) a first communication from a first network slice artifact (e.g., first network slice artifact 106A illustrated in FIG. 1) executing on a computer system (e.g., UE 102 illustrated in FIG. 1), the first communication comprising an identity of the first network slice (e.g., first network slice 114A). At block 224, the method 220 comprises comparing by a first network function (e.g., NSSAI 122 illustrated in FIG. 1) of the network the identity of the first network slice communicated from the first network slice artifact with a first set of executable instructions associated with the first network slice.

At block 226, the method 220 comprises retrieving the first set of executable instructions by the first network function from a data store (e.g., second store 124 illustrated in FIG. 1) of the network in response to matching the identity of the network slice with the first set of executable instructions. At block 228, the method 220 comprises communicating the first set of executable instructions by the first network function to the first network slice artifact whereby the first network slice artifact instantiates the first network slice transforming the computer system into an endpoint node of the first network slice. In an embodiment, a hash of a binary code associated with the first set of executable instructions is embedded in the first network slice artifact and the first network slice artifact is configured to execute the first set of executable instructions in response to matching the embedded hash with a hash of a binary code calculated from the first set of executable instructions received from the first network function.

Figure 5:
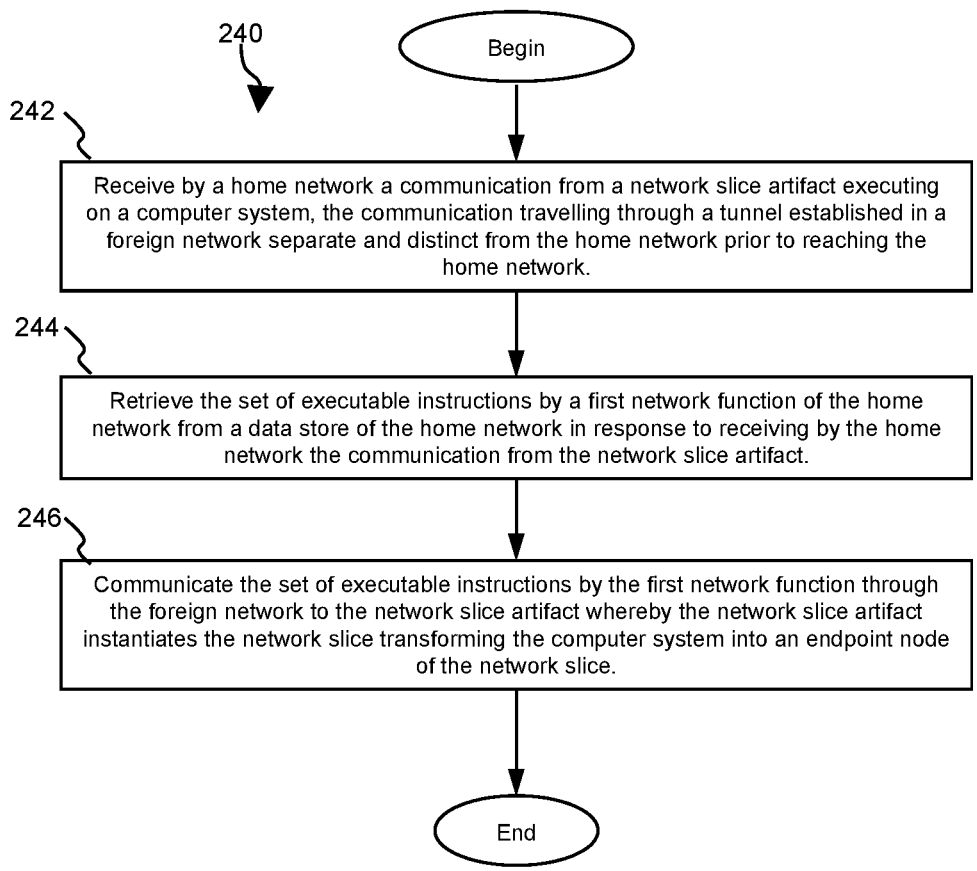
FIG. 5 is a flow chart of another method according to an embodiment of the disclosure.

Turning to FIG. 5, a method 240 is described. In an embodiment, the method 240 is another method for delivering a network slice to a user. At block 242, the method 240 comprises receiving by a home network (e.g., network 112 illustrated in FIG. 1) a communication from a network slice artifact (e.g., one of network slice artifacts 106A, 106B illustrated in FIG. 1) executing on a computer system (e.g., UE 102 illustrated in FIG. 1), the communication travelling through a tunnel established in a foreign network separate and distinct from the home network prior to reaching the home network. In an embodiment, the network slice artifact comprises a multi-segment filename (e.g., one of multi-segment filenames 108A, 108B illustrated in FIG. 1) comprising a first segment comprising instructions for executing the network slice artifact, and a second segment comprising an identity of a network slice (e.g., one of network slices 114A, 114B illustrated in FIG. 1) instantiable by the network slice artifact, and wherein the communication comprises the identity of the network slice and an identity of the home network.

At block 244, the method 240 comprises retrieving the set of executable instructions by a first network function (e.g., NSSAI 122 illustrated in FIG. 1) of the home network from a data store of the home network in response to receiving by the home network the communication from the network slice artifact. At block 246, the method 240 comprises communicating the set of executable instructions by the first network function through the foreign network to the network slice artifact whereby the network slice artifact instantiates the network slice transforming the computer system into an endpoint node of the network slice.

Figure 6A:
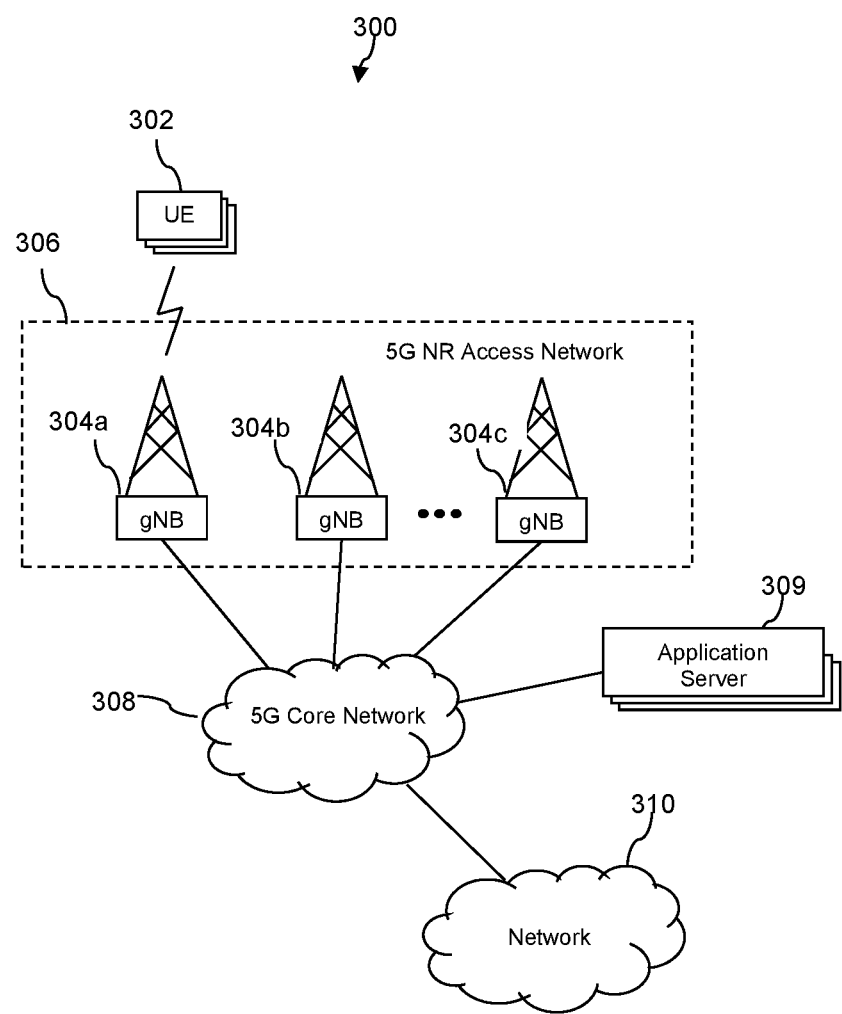
FIG. 6A is a block diagram of another communication system according to an embodiment of the disclosure.

Turning now to FIG. 6A, an exemplary communication system 300 is described. At least some of the components of communication system 100 (e.g., one or more of UEs 102, access node 104, network 112, etc.) shown in FIG. 1 may be implemented in accordance and in a matter consistent with the teachings of communication system 300 shown in FIG. 6A. Typically the communication system 300 includes a number of access nodes 304 that are configured to provide coverage in which UEs 302 such as cell phones, tablet computers, machine-type-communication devices, tracking devices, embedded wireless modules, and/or other wirelessly equipped communication devices (whether or not user operated), can operate. In some embodiments, access node 104 of the communication system 100 shown in FIG. 1 may be configured similarly as access nodes 304 of communication system 300. Additionally, in some embodiments, one or more of UEs 102 of the communication system 100 shown in FIG. 1 may be configured similarly as UEs 302. The access nodes 304 may be said to establish an access network 306. The access network 306 may be referred to as a radio access network (RAN) in some contexts. In a 5G technology generation an access node 304 may be referred to as a gigabit Node B (gNB). In 4G technology (e.g., long term evolution (LTE) technology) an access node 304 may be referred to as an enhanced Node B (eNB). In 3G technology (e.g., code division multiple access (CDMA) and global system for mobile communication (GSM)) an access node 304 may be referred to as a base transceiver station (BTS) combined with a basic station controller (BSC). In some contexts, the access node 304 may be referred to as a cell site or a cell tower. In some implementations, a picocell may provide some of the functionality of an access node 304, albeit with a constrained coverage area. Each of these different embodiments of an access node 304 may be considered to provide roughly similar functions in the different technology generations.

In an embodiment, the access network 306 comprises a first access node 304a, a second access node 304b, and a third access node 304c. It is understood that the access network 306 may include any number of access nodes 304. Further, each access node 304 could be coupled with a core network 308 that provides connectivity with various application servers 309 and/or a network 310. In some embodiments, network 112 of the communication system 100 shown in FIG. 1 may be configured similarly as core network 308. In an embodiment, at least some of the application servers 309 may be located close to the network edge (e.g., geographically close to the UE 302 and the end user) to deliver so-called "edge computing." The network 310 may be one or more private networks, one or more public networks, or a combination thereof. The network 310 may comprise the public switched telephone network (PSTN). The network 310 may comprise the Internet. With this arrangement, a UE 302 within coverage of the access network 306 could engage in air-interface communication with an access node 304 and could thereby communicate via the access node 304 with various application servers and other entities.

The communication system 300 could operate in accordance with a particular radio access technology (RAT), with communications from an access node 304 to UEs 302 defining a downlink or forward link and communications from the UEs 302 to the access node 304 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 304 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 304 could define an air interface configured in a specific manner to define physical resources for carrying information wirelessly between the access node 304 and UEs 302.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 302.

In addition, certain resource elements on the example air interface could be reserved for special purposes. For instance, on the downlink, certain resource elements could be reserved to carry synchronization signals that UEs 302 could detect as an indication of the presence of coverage and to establish frame timing, other resource elements could be reserved to carry a reference signal that UEs 302 could measure in order to determine coverage strength, and still other resource elements could be reserved to carry other control signaling such as PRB-scheduling directives and acknowledgement messaging from the access node 304 to served UEs 302. And on the uplink, certain resource elements could be reserved to carry random access signaling from UEs 302 to the access node 304, and other resource elements could be reserved to carry other control signaling such as PRB-scheduling requests and acknowledgement signaling from UEs 302 to the access node 304.

The access node 304, in some instances, may be split functionally into a radio unit (RU), a distributed unit (DU), and a central unit (CU) where each of the RU, DU, and CU have distinctive roles to play in the access network 306. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
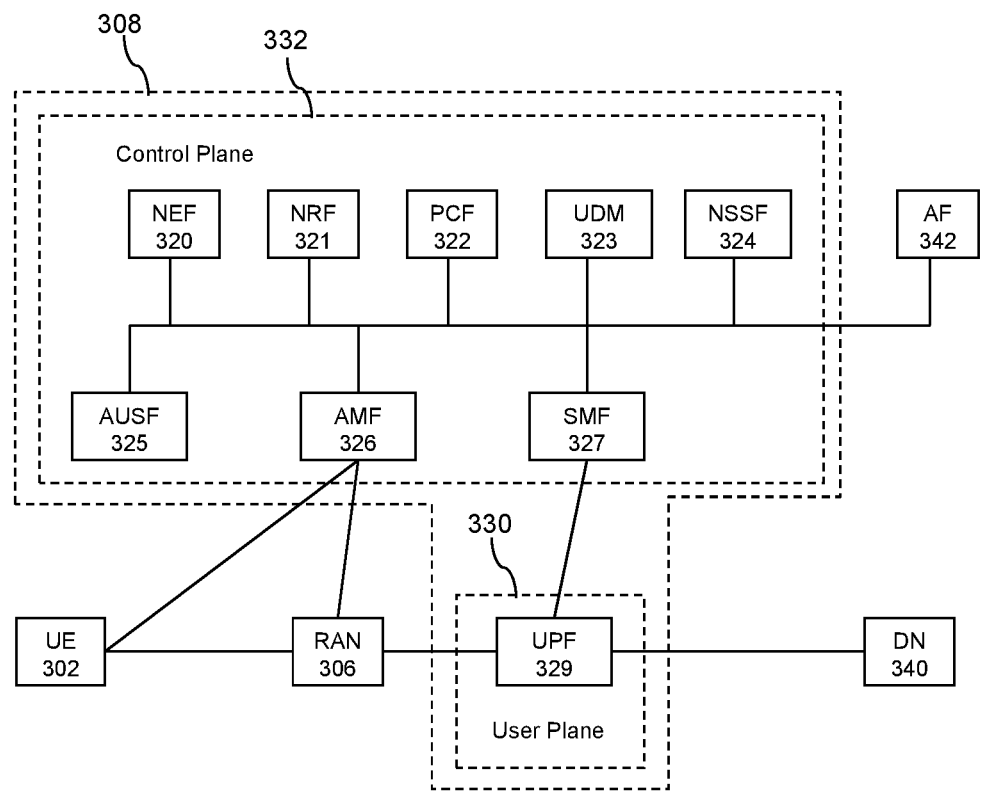
FIG. 6B is a block diagram of a core network of the communication system of FIG. 6A according to an embodiment of the disclosure.

Turning now to FIG. 6B, further details of the core network 308 are described. In an embodiment, the core network 308 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 329, an authentication server function (AUSF) 325, an access and mobility management function (AMF) 326, a session management function (SMF) 327, a network exposure function (NEF) 320, a network repository function (NRF) 321, a policy control function (PCF) 322, a unified data management (UDM) 323, a network slice selection function (NSSF) 324, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 308 may be segregated into a user plane 330 and a control plane 332, thereby promoting independent scalability, evolution, and flexible deployment.

The UPF 329 delivers packet processing and links the UE 302, via the access node 306, to a data network 340 (e.g., the network 310 illustrated in FIG. 6A). The AMF 326 handles registration and connection management of non-access stratum (NAS) signaling with the UE 302. Said in other words, the AMF 326 manages UE registration and mobility issues. The AMF 326 manages reachability of the UEs 302 as well as various security issues. The SMF 327 handles session management issues. Specifically, the SMF 327 creates, updates, and removes (destroys) protocol data unit (PDU) sessions and manages the session context within the UPF 329. The SMF 327 decouples other control plane functions from user plane functions by performing dynamic host configuration protocol (DHCP) functions and IP address management functions. The AUSF 325 facilitates security processes.

The NEF 320 securely exposes the services and capabilities provided by network functions. The NRF 321 supports service registration by network functions and discovery of network functions by other network functions. The PCF 322 supports policy control decisions and flow based charging control. The UDM 323 manages network user data and can be paired with a user data repository (UDR) that stores user data such as customer profile information, customer authentication number, and encryption keys for the information. An application function 342, which may be located outside of the core network 308, exposes the application layer for interacting with the core network 308. In an embodiment, the application function 342 may be execute on an application server 309 located geographically proximate to the UE 302 in an "edge computing" deployment mode. The core network 308 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 324 can help the AMF 326 to select the network slice instance (NSI) for use with the UE 302.

Figure 7:
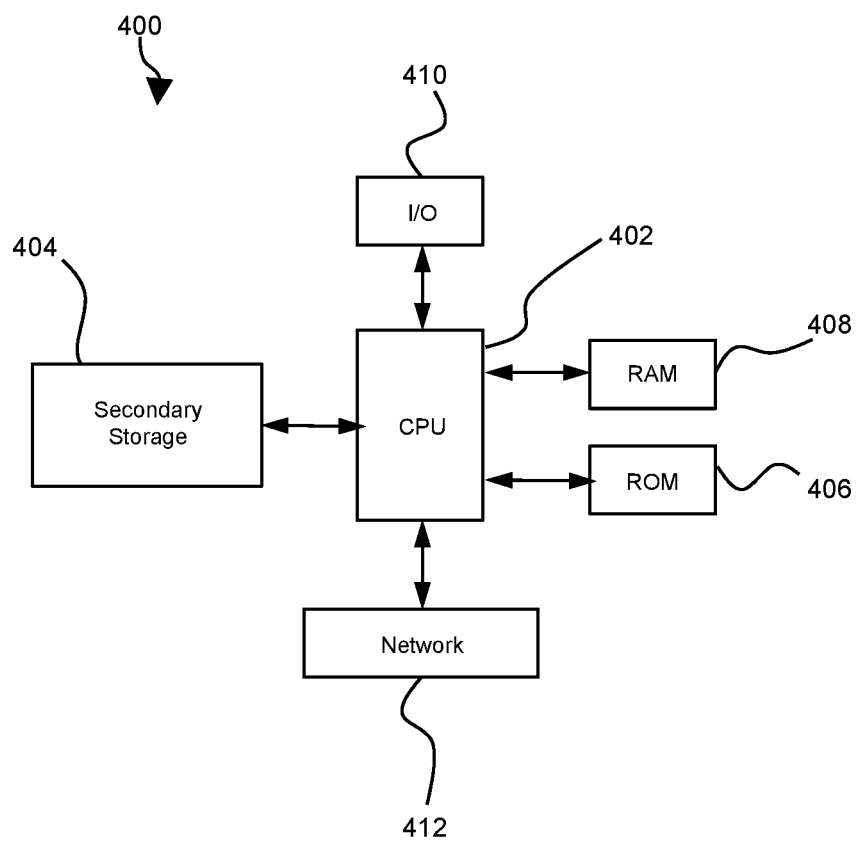
FIG. 7 is a block diagram of a computer system according to an embodiment of the disclosure.

FIG. 7 illustrates a computer system 400 suitable for implementing one or more embodiments disclosed herein. The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips.

It is understood that by programming and/or loading executable instructions onto the computer system 400, at least one of the CPU 402, the RAM 408, and the ROM 406 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted, the CPU 402 may execute a computer program or application. For example, the CPU 402 may execute software or firmware stored in the ROM 406 or stored in the RAM 408. In some cases, on boot and/or when the application is initiated, the CPU 402 may copy the application or portions of the application from the secondary storage 404 to the RAM 408 or to memory space within the CPU 402 itself, and the CPU 402 may then execute instructions that the application is comprised of. In some cases, the CPU 402 may copy the application or portions of the application from memory accessed via the network connectivity devices 412 or via the I/O devices 410 to the RAM 408 or to memory space within the CPU 402, and the CPU 402 may then execute instructions that the application is comprised of. During execution, an application may load instructions into the CPU 402, for example load some of the instructions of the application into a cache of the CPU 402. In some contexts, an application that is executed may be said to configure the CPU 402 to do something, e.g., to configure the CPU 402 to perform the function or functions promoted by the subject application. When the CPU 402 is configured in this way by the application, the CPU 402 becomes a specific purpose computer or a specific purpose machine.

The secondary storage 404 is typically comprised of one or more disk drives or tape drives and is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 is typically faster than to secondary storage 404. The secondary storage 404, the RAM 408, and/or the ROM 406 may be referred to in some contexts as computer readable storage media and/or non-transitory computer readable media.

I/O devices 410 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 412 may provide wired communication links and/or wireless communication links (e.g., a first network connectivity device 412 may provide a wired communication link and a second network connectivity device 412 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 402 executes instructions, codes, computer programs, scripts which it accesses from hard disk, floppy disk, optical disk (these various disk based systems may all be considered secondary storage 404), flash drive, ROM 406, RAM 408, or the network connectivity devices 412. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 404, to the ROM 406, to the RAM 408, and/or to other non-volatile memory and volatile memory of the computer system 400. The processor 402 may process the executable instructions and/or data structures in part by directly accessing the computer program product, for example by reading from a CD-ROM disk inserted into a disk drive peripheral of the computer system 400. Alternatively, the processor 402 may process the executable instructions and/or data structures by remotely accessing the computer program product, for example by downloading the executable instructions and/or data structures from a remote server through the network connectivity devices 412. The computer program product may comprise instructions that promote the loading and/or copying of data, data structures, files, and/or executable instructions to the secondary storage 404, to the ROM 406, to the RAM 408, and/or to other non-volatile memory and volatile memory of the computer system 400.

In some contexts, the secondary storage 404, the ROM 406, and the RAM 408 may be referred to as a non-transitory computer readable medium or a computer readable storage media. A dynamic RAM embodiment of the RAM 408, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for delivering a network slice to a user, comprising:
   receiving by a network a communication from a network slice artifact executing on a computer system, the network slice artifact comprising a multi-segment filename that includes a first segment comprising instructions for executing the network slice artifact, and a second segment comprising an identity of a network slice instantiable by the network slice artifact, wherein each segment of the multi-segment filename comprises a field that includes information used in instantiation of the network slice, and wherein the communication comprises the identity of the network slice;
   storing a set of executable instructions on the network by a first network function prior to receiving the communication from the network slice artifact, wherein the set of executable instructions are stored in a distributed ledger;
   retrieving the set of executable instructions associated with the network slice by the first network function of the network from a data store of the network in response to receiving by the network the communication from the network slice artifact;
   communicating the set of executable instructions by the first network function to the network slice artifact whereby the network slice artifact instantiates the network slice transforming the computer system into an endpoint node of the network slice; and
   completing the instantiation of the network slice on the network by a second network function of the network in response to receiving by the network the communication from the network slice artifact, wherein the network slice comprises a first set of network functions upon instantiation, wherein the multi-segment filename comprises a third segment embedded with a hash of a binary code associated with the set of executable instructions, and wherein the network slice artifact is configured to execute the set of executable instructions in response to matching the embedded hash with a hash of a binary code calculated from the set of executable instructions received from the first network function.

2. The method of claim 1, wherein the first network function comprises network slice assistance information (NSSAI) and the second network function comprises a network slice subnet element administrator (NSSEA).

3. The method of claim 2, wherein the method further comprises:
   determining a set of parameters of the network slice by a vertical slice descriptor of the NSSEA in response to receiving the communication;
   generating one or more services providable by the network slice by a service compiler of the NSSEA in response to receiving the communication; and
   provisioning a resource layer of the network by a resource layer orchestrator of the NSEEA with a binary code associated with the set of executable instructions to enable the resource layer to provide the set of parameters determined by the vertical slice descriptor in response to receiving the communication.

4. The method of claim 3, wherein:
   the second segment of the multi-segment filename comprises at least some of the parameters of the vertical slice descriptor; and
   a third segment of the multi-segment filename comprises at least some of the binary code of the resource layer orchestrator.

5. The method of claim 1, wherein the network slice artifact is captured in one or more blocks of a blockchain stored on the computer system.

6. The method of claim 1, wherein:
   the network comprises a home network and the communication travels through a tunnel established in a foreign network separate and distinct from the home network; and
   the set of executable instructions are communicated by the first network function through the foreign network to the network slice artifact.

7. A method for delivering a network slice to a user, comprising:
   receiving by a home network a communication from a network slice artifact executing on a computer system, the communication travelling through a tunnel established in a foreign network separate and distinct from the home network prior to reaching the home network, the network slice artifact comprising a multi-segment filename comprising a first segment comprising instructions for executing the network slice artifact, and a second segment comprising an identity of a network slice instantiable by the network slice artifact, wherein each segment of the multi-segment filename comprises a field that includes information used in instantiation of the network slice, and wherein the communication comprises the identity of the network slice and an identity of the home network;

storing a set of executable instructions on the network by a first network function prior to receiving the communication from the network slice artifact, wherein the set of executable instructions are stored in a distributed ledger;

retrieving the set of executable instructions by the first network function of the home network from a data store of the home network in response to receiving by the home network the communication from the network slice artifact; and communicating the set of executable instructions by the first network function through the foreign network to the network slice artifact whereby the network slice artifact instantiates the network slice transforming the computer system into an endpoint node of the network slice, wherein the multi-segment filename comprises a third segment embedded with a hash of a binary code associated with the set of executable instructions and wherein the network slice artifact is configured to execute the set of executable instructions in response to matching the embedded hash with a hash of a binary code calculated from the set of executable instructions received from the first network function.

8. The method of claim 7, further comprising:

determining a set of parameters of the network slice by a vertical slice descriptor of the second network function in response to receiving the communication, wherein the second network function comprises network slice subnet element administrator (NSSEA);

generating one or more services providable by the network slice by a service compiler of the NSSEA in response to receiving the communication; and provisioning a resource layer of the network by a resource layer orchestrator of the NSEEA with a binary code associated with the set of executable instructions to enable the resource layer to provide the set of parameters determined by the vertical slice descriptor in response to receiving the communication.

9. The method of claim 8, wherein:

the second segment of the multi-segment filename comprises at least some of the parameters of the vertical slice descriptor; and a third segment of the multi-segment filename comprises at least some of the binary code of the resource layer orchestrator.

10. A system for delivering a network slice to a user, comprising:

a computer system comprising a network slice artifact that, when executed on the computer system:

transmits a communication to a network, the network slice artifact comprising a multi-segment filename that includes a first segment comprising instructions for executing the network slice artifact, a second segment comprising an identity of a network slice instantiable by the network slice artifact, and a third segment embedded with a hash of a binary code associated with a set of executable instructions, wherein each segment of the multi-segment filename comprises a field that includes information used in instantiation of the network slice, and wherein the communication comprises the identity of the network slice, receives the set of executable instructions associated with the network slice retrieved by a first network function of the network from a data store of the network in response to receiving by the network the communication from the network slice artifact, wherein the set of executable instructions are stored on the network by the first network function prior to receiving the communication from the network slice artifact, and wherein the set of executable instructions are stored in a distributed ledger, executes the set of executable instructions in response to matching the embedded hash with a hash of a binary code calculated from the set of executable instructions received from the first network function, and instantiates the network slice transforming the computer system into an endpoint node of the network slice, wherein the instantiation of the network slice is completed on the network by a second network function of the network in response to receiving by the network the communication from the network slice artifact, and wherein the network slice comprises a first set of network functions upon instantiation.

11. The system of claim 10, wherein the first network function comprises network slice assistance information (NSSAI) and the second network function comprises a network slice subnet element administrator (NSSEA).

12. The system of claim 10, wherein the network slice artifact is captured in one or more blocks of a blockchain stored on the computer system.

13. The system of claim 10, wherein:

the network comprises a home network and the communication travels through a tunnel established in a foreign network separate and distinct from the home network; and the set of executable instructions are communicated by the first network function through the foreign network to the network slice artifact.

* * * * *